United States Patent
Hernandez et al.

(10) Patent No.: US 12,447,802 B2
(45) Date of Patent: Oct. 21, 2025

(54) WATERFALL GRILLE OF HVAC SYSTEM

(71) Applicant: GM GLOBAL TECHNOLOGY OPERATIONS LLC, Detroit, MI (US)

(72) Inventors: Mariana Hernandez, Mexico City (MX); Estephany Andrea Osorio, Tlaxcala (MX); Isidro Antonio Gonzalez, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 624 days.

(21) Appl. No.: 17/878,419

(22) Filed: Aug. 1, 2022

(65) Prior Publication Data

US 2024/0034130 A1  Feb. 1, 2024

(51) Int. Cl.
   *B60H 1/34* (2006.01)
(52) U.S. Cl.
   CPC .................. *B60H 1/3407* (2013.01)
(58) Field of Classification Search
   CPC . B60H 1/24; B60H 1/30; B60H 1/345; B60H 1/267; B60H 1/249; B60H 1/3407; B60H 1/3414; F26B 17/1416
   See application file for complete search history.

(56) References Cited

U.S. PATENT DOCUMENTS 4,316,406 A   2/1982 Lind

FOREIGN PATENT DOCUMENTS

| DE | 102013211185 A1 | 12/2013 |
|----|----|----|
| JP | S61159733 A | 7/1986 |
| JP | 2000255256 A | 9/2000 |
| JP | 3563874 B2 * | 9/2004 |

OTHER PUBLICATIONS

Translation, JP-3563874-B2 (Year: 2004).*
German Office Action for German Applicaiton No. 102023100910.9; dated Nov. 3, 2023; 6 pages.

* cited by examiner

*Primary Examiner* — Jessica Yuen
(74) *Attorney, Agent, or Firm* — CANTOR COLBURN LLP

(57) ABSTRACT

An airflow grille of a heating, ventilation and air conditioning (HVAC) system includes a grille housing and a grille plate assembled to the grille housing. The grille housing and the grille plate define a grille plenum therebetween. An airflow inlet in defined in the grille housing and a plurality of airflow outlets are defined in the grille plate. A plurality of vane arrangements are arrayed on the grille plate. Each vane arrangement located between adjacent airflow outlets of the grille plate. Each vane arrangement is configured such that at each vane arrangement a first portion of a conditioned airflow flowing through the airflow grille is directed between the grille housing and the vane arrangement and a second portion of the conditioned airflow exits the airflow grille through a corresponding airflow outlet of the plurality of airflow outlets.

14 Claims, 4 Drawing Sheets

WATERFALL GRILLE OF HVAC SYSTEM

INTRODUCTION

The subject disclosure relates to vehicles, and in particular to heating, ventilation and air conditioning (HVAC) systems of vehicles.

Vehicle HVAC systems typically use air ducts having air outlets to distribute conditioned airflow, either heated or cooled by the HVAC system, to a target location of an interior of the vehicle; such as a lower body area of a vehicle occupant or to a windshield of the vehicle. Such ducts typically have one or two large air outlets, and the distribution of the conditioned airflow across the target location or area is uneven.

Accordingly, it is desirable to provide an air duct and airflow outlets which more evenly distribute conditioned airflow over the target location to improve performance of the HVAC system and improve occupant comfort.

SUMMARY

In one embodiment, an airflow grille of a heating, ventilation and air conditioning (HVAC) system includes a grille housing and a grille plate assembled to the grille housing. The grille housing and the grille plate define a grille plenum therebetween. An airflow inlet in defined in the grille housing and a plurality of airflow outlets are defined in the grille plate. A plurality of vane arrangements are arrayed on the grille plate. Each vane arrangement located between adjacent airflow outlets of the grille plate. Each vane arrangement is configured such that at each vane arrangement a first portion of a conditioned airflow flowing through the airflow grille is directed between the grille housing and the vane arrangement and a second portion of the conditioned airflow exits the airflow grille through a corresponding airflow outlet of the plurality of airflow outlets.

Additionally or alternatively, in this or other embodiments the plurality of vane arrangements are configured to substantially equalize a volume of conditioned airflow flowing through the airflow outlets of the plurality of airflow outlets.

Additionally or alternatively, in this or other embodiments each vane arrangement includes a plurality of vanes extending from the grille plate.

Additionally or alternatively, in this or other embodiments the plurality of vanes include a plurality of primary vanes and a plurality of secondary vanes arranged parallel to the plurality of primary vanes.

Additionally or alternatively, in this or other embodiments each vane of the plurality of vanes and the grille housing define a vane gap therebetween. The vane gap increases with increasing distance from the airflow inlet.

Additionally or alternatively, in this or other embodiments each vane of the plurality of vanes extends from the grille plate to a vane height. The vane height decreases with increasing distance of the vane from the airflow inlet.

Additionally or alternatively, in this or other embodiments the plurality of vanes in each vane arrangement are arranged in a V-shape.

Additionally or alternatively, in this or other embodiments a cross-sectional area of each airflow outlet of the plurality of airflow outlets increases with increasing distance of the airflow outlet from the airflow inlet.

Additionally or alternatively, in this or other embodiments the airflow inlet is located at a first end of the airflow grille.

Additionally or alternatively, in this or other embodiments the grille housing is formed as a concave shape and the grille plate is substantially flat and planar.

In another embodiment, a heating, ventilation and air conditioning (HVAC) system of a vehicle includes an HVAC unit to generate a conditioned airflow, and one or more airflow grilles operably connected to the HVAC unit to distribute the conditioned airflow to one or more target locations of an occupant compartment of the vehicle. Each airflow grille of the one or more airflow grilles includes a grille housing, and a grille plate assembled to the grille housing. The grille housing and the grille plate define a grille plenum therebetween. An airflow inlet is defined in the grille housing and a plurality of airflow outlets are defined in the grille plate. A plurality of vane arrangements are arrayed on the grille plate. Each vane arrangement is located between adjacent airflow outlets of the grille plate. Each vane arrangement is configured such that at each vane arrangement a first portion of a conditioned airflow flowing through the airflow grille is directed between the grille housing and the vane arrangement and a second portion of the conditioned airflow exits the airflow grille through a corresponding airflow outlet of the plurality of airflow outlets.

Additionally or alternatively, in this or other embodiments the plurality of vane arrangements are configured to substantially equalize a volume of conditioned airflow flowing through the airflow outlets of the plurality of airflow outlets.

Additionally or alternatively, in this or other embodiments each vane arrangement includes a plurality of vanes extending from the grille plate.

Additionally or alternatively, in this or other embodiments the plurality of vanes include a plurality of primary vanes and a plurality of secondary vanes arranged parallel to the plurality of primary vanes.

Additionally or alternatively, in this or other embodiments each vane of the plurality of vanes and the grille housing define a vane gap therebetween. The vane gap increases with increasing distance from the airflow inlet.

Additionally or alternatively, in this or other embodiments each vane of the plurality of vanes extends from the grille plate to a vane height. The vane height decreases with increasing distance of the vane from the airflow inlet.

Additionally or alternatively, in this or other embodiments the plurality of vanes in each vane arrangement are arranged in a V-shape.

Additionally or alternatively, in this or other embodiments a cross-sectional area of each airflow outlet of the plurality of airflow outlets increases with increasing distance of the airflow outlet from the airflow inlet.

Additionally or alternatively, in this or other embodiments the airflow inlet is disposed at a first end of the airflow grille.

Additionally or alternatively, in this or other embodiments the grille housing is formed as a concave shape and the grille plate is substantially flat and planar.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
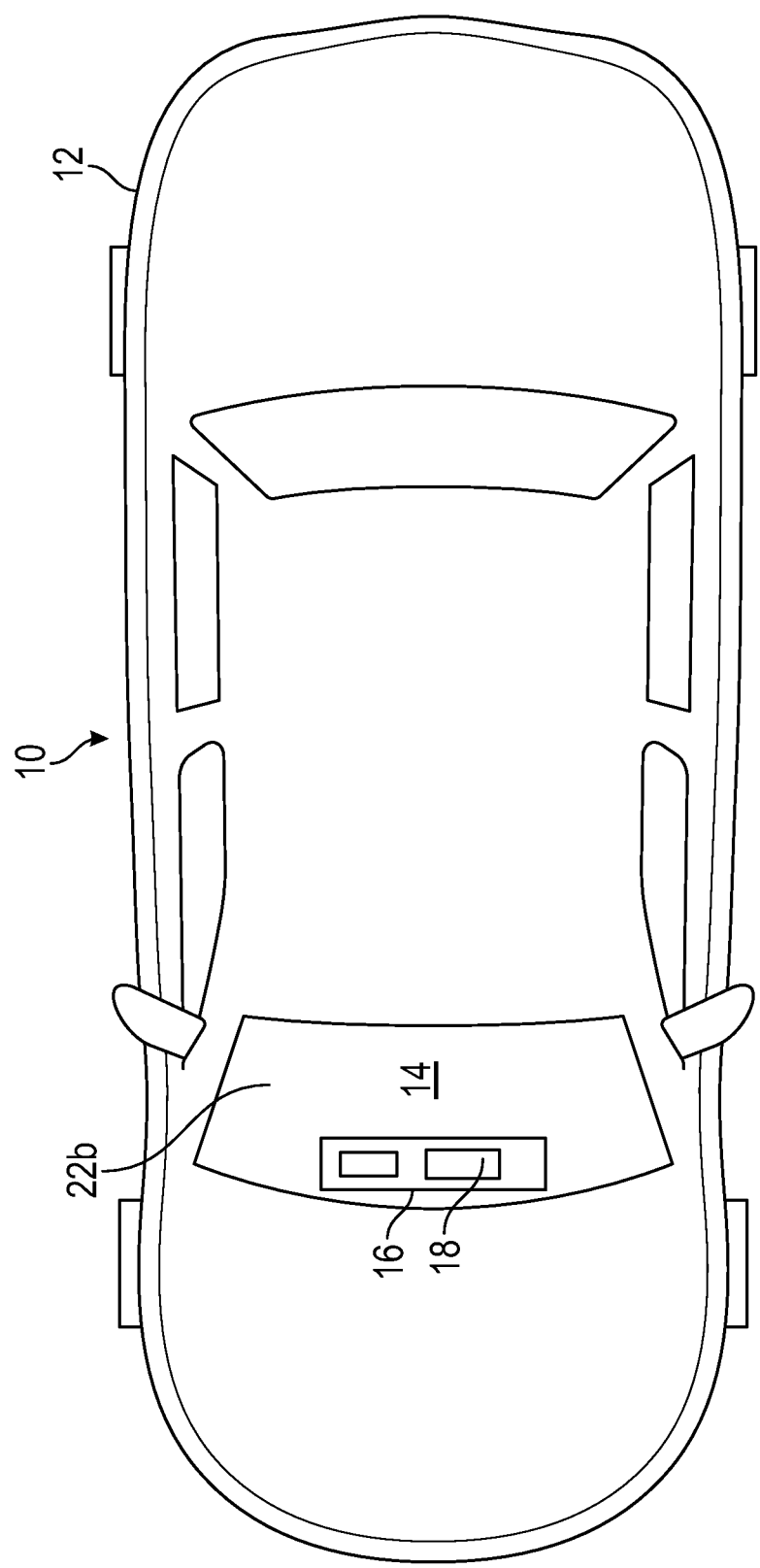
FIG. 1 is an illustration of an embodiment of a vehicle.

The following description is merely exemplary in nature and is not intended to limit the present disclosure, its application or uses. It should be understood that throughout the drawings, corresponding reference numerals indicate like or corresponding parts and features.

Figure 2:
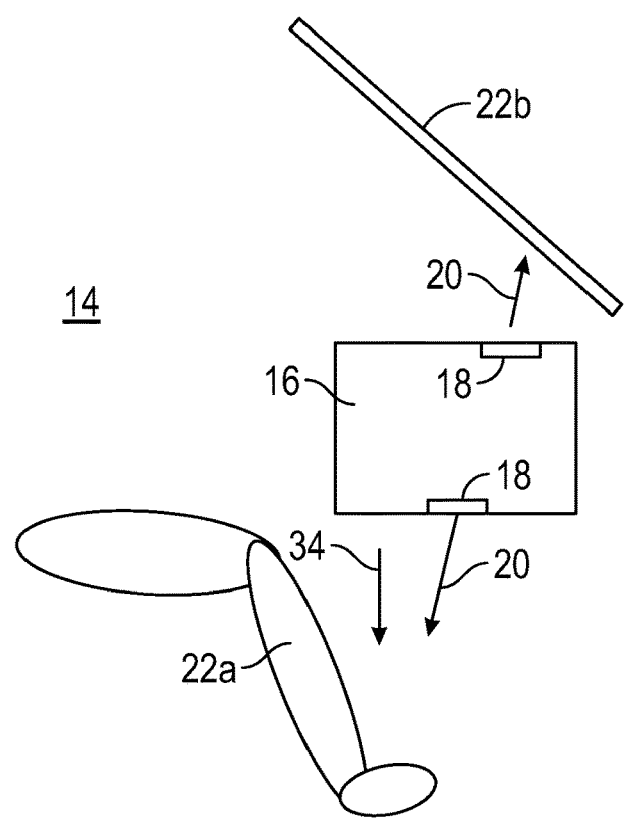
FIG. 2 is an illustration of an embodiment of a heating, ventilation and air conditioning system installed into a vehicle.

In accordance with an exemplary embodiment, a vehicle 10 is illustrated in FIG. 1. The vehicle 10 includes a vehicle body 12 defining an occupant compartment 14 of the vehicle 10. A heating, ventilation and air conditioning (HVAC) system 16 is disposed in the vehicle 10 and is operably connected to one or more air outlets, for example, a waterfall grille 18. Referring now to FIG. 2, the waterfall grille 18 is configured to output a conditioned airflow 20 from the HVAC system 16 into the occupant compartment 14, and to distribute the conditioned airflow 20 across one or more target zones 22 in the occupant compartment 14. The one or more target zones 22 may include, for example, a lower body area 22*a* of an occupant or a windshield 22*b* of the vehicle 10.

Figure 3:
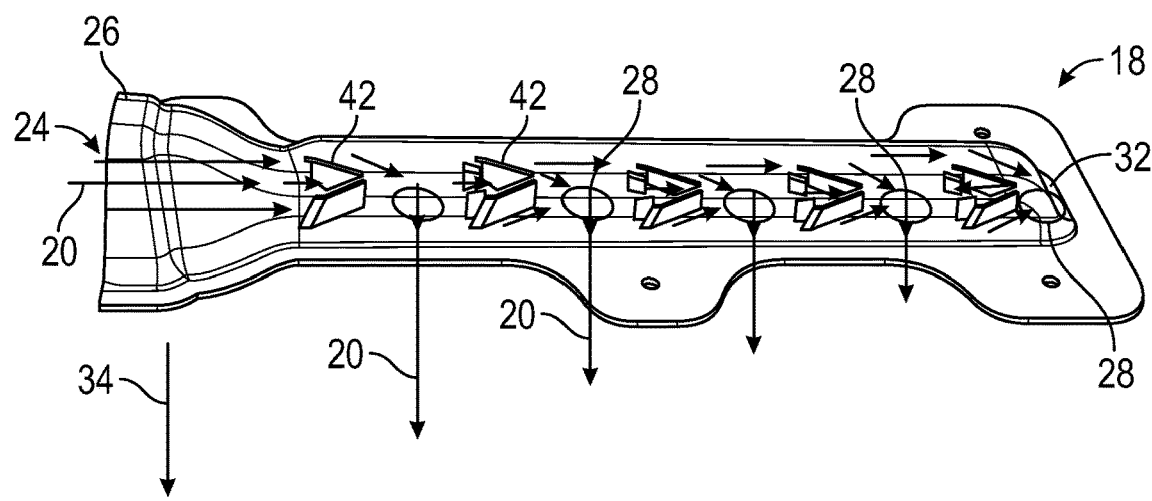
FIG. 3 is a perspective view of an embodiment of a waterfall grille.
Figure 4:
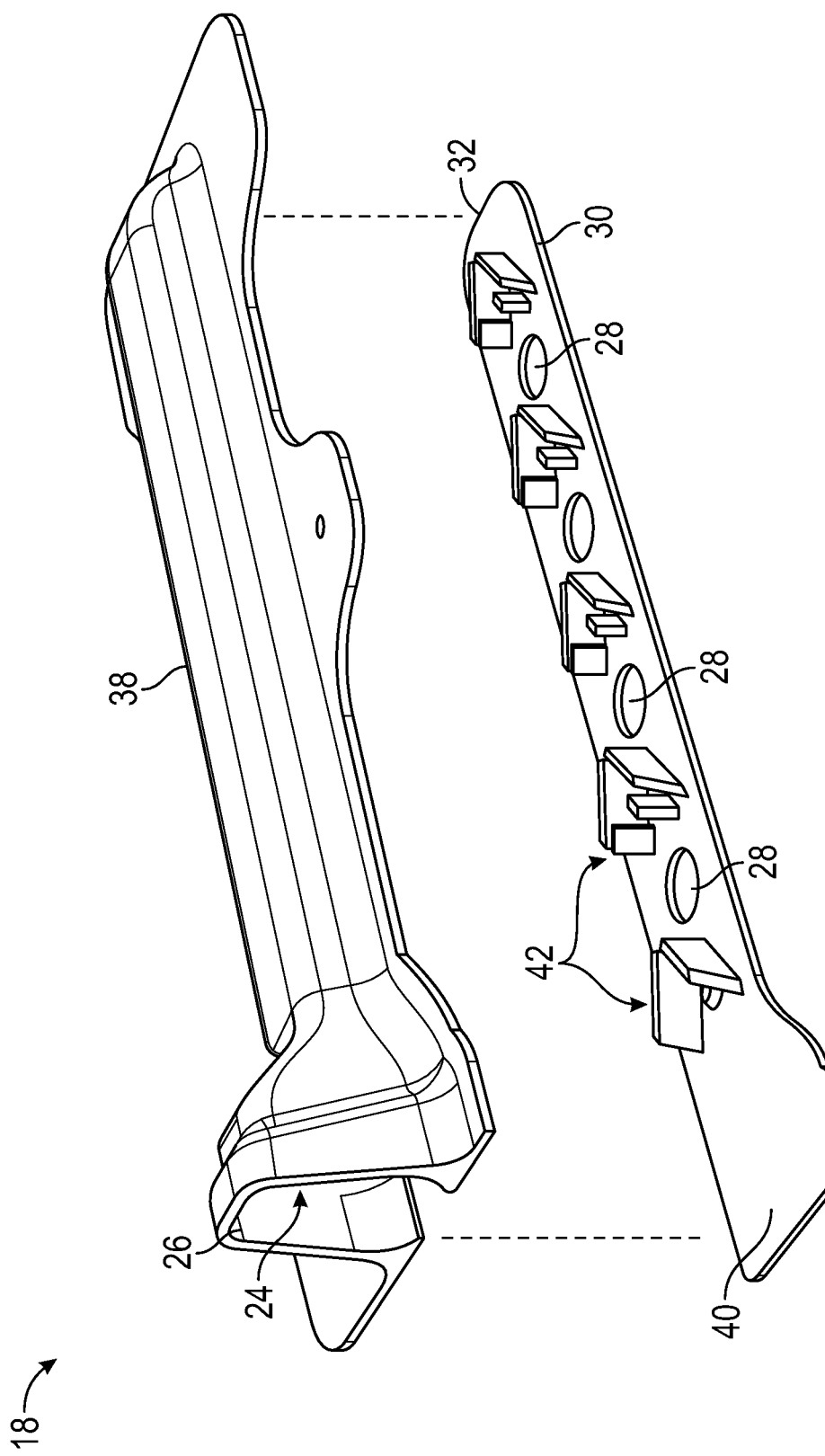
FIG. 4 is a disassembled view of an embodiment of a waterfall grille.

Referring now to FIGS. 3 and 4, illustrated is an embodiment of the waterfall grille 18, which includes an airflow inlet 24 disposed at a first end 26 of the waterfall grille 18, and a plurality of airflow outlets 28 disposed at an outlet surface 30 of the waterfall grille 18. The plurality of airflow outlets 28 are arrayed along the outlet surface 30 between the first end 26 and a second end 32 of the waterfall grille 18. The plurality of airflow outlets 28 are configured to evenly distribute the conditioned airflow 20 across the target zone 22. In some embodiments, the outlet surface 30 is flat and planar, and the plurality of outlets 28 are oriented to direct the conditioned airflow 20 in an outward direction 34. One skilled in the art will readily appreciate that other orientations of the plurality of airflow outlets 28 are contemplated within the scope of the present disclosure. As illustrated in FIG. 2, the waterfall grille 18 is operably connected to the HVAC system 16, such that the conditioned airflow 20 is directed from the HVAC system 16 and into the airflow inlet 24 of the waterfall grille 18.

FIG. 4 illustrates a disassembled view of an embodiment of the waterfall grille 18. The waterfall grille 18 includes a grille housing 38, which is formed as a cross-sectionally concave shape, and a grille plate 40 including the outlet surface 30 in which the plurality of airflow outlets 28 are defined. In some embodiments such as shown in FIG. 4, the grille plate 40 is substantially flat and planar, and the grille housing 38 and the grille plate 40 define an airflow plenum therebetween, between the airflow inlet 24 and the plurality of airflow outlets 28. A vane arrangement 42 is positioned between adjacent airflow outlets 28 of the plurality of airflow outlets 28. The grille plate 40 is secured to the grille housing 38 by, for example, a snap connection or one or more screws. One skilled in the art, however, will readily appreciate that these securing means are merely exemplary and that other elements or processes may be used to secure the grille plate 40 to the grille housing 38. Further, in some embodiments, the grille housing 38 and the grille plate 40 are formed from a polymer material by, for example, an injection molding process or one or more additive manufacturing processes. In one embodiment, the waterfall grille 18 may be formed as a single, unitary component.

Figure 5:
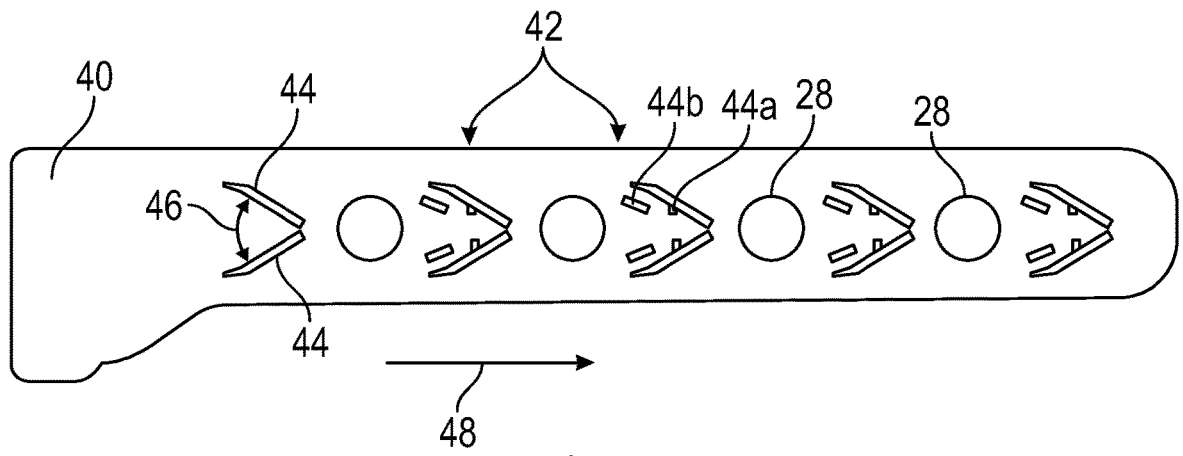
FIG. 5 is a plan view of an embodiment of a grille plate of a waterfall grille.
Figure 6:
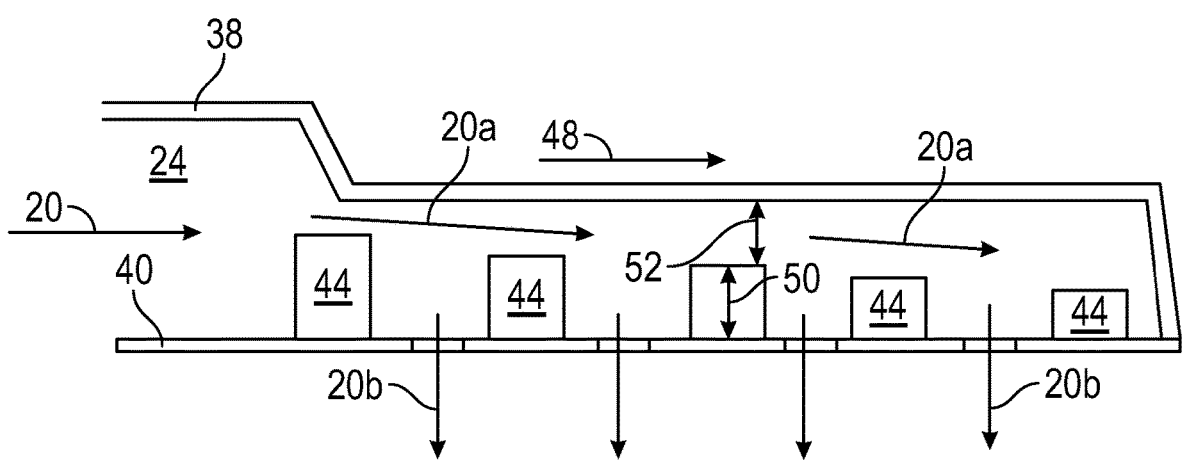
FIG. 6 is a cross-sectional view of an embodiment of a waterfall grille.

Referring now to FIGS. 5 and 6, the vane arrangements 42 will be described in more detail. Each vane arrangement 42 includes at least two vanes 44 arranged in a V-shape having a vane angle 46 relative to a general airflow direction 48 along the grille plate 40. In some embodiments, the vane angle 46 is in the range of 20 degrees to 60 degrees. The vanes 44 may include primary vanes 44*a* and secondary vanes 44*b*, which in some embodiments are parallel to the primary vanes 44*a*. The vanes 44 have a vane height 50 which decreases with increasing distance from the airflow inlet 24 in the airflow direction 48. The decrease in vane height 50 increases a vane gap 52 between the vane 44 and the grille housing 38. Additionally, in some embodiments, the number of vanes 44 in the vane arrangement 42 and/or the vane angle 46 may vary along the airflow direction 48.

As the conditioned airflow 20 enters the waterfall grille 18 at the airflow inlet 24, the conditioned airflow 20 encounters the vanes 44 and a first portion 20*a* of the conditioned airflow 20 is directed through the vane gap 52, while a second portion 20*b* of the conditioned airflow 20 is directed through an airflow outlet 28. As the conditioned airflow 20 proceeds along the waterfall grille 18 in the airflow direction 48, the vane gap 52 increases, thereby allowing a greater flow of the first portion 20*a* through the vane gap 52. This substantially equalizes the second portion 20*b* of the conditioned airflow 20 flowing through each of the airflow outlets 28 of the plurality of airflow outlets 28. Further, to provide additional tuning of the second portion 20*b* of the conditioned airflow 20 flowing through the airflow outlets 28, a cross-sectional area of the airflow outlets 28 may vary with distance from the airflow inlet 14. For example, the cross-sectional area of the airflow outlets 28 may increase with increasing distance from the airflow inlet 14 to increase the amount of conditioned airflow 20 through the airflow outlets 28 furthest from the airflow inlet 14 to counteract the loss in airflow pressure with increasing distance from the airflow inlet 14. Additionally, while five airflow outlets are illustrated in FIG. 3, this is merely exemplary, and other numbers of airflow outlets 28 and vane arrangements 42 may be utilized to achieve the desired airflow distribution.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An airflow grille of a heating, ventilation and air conditioning (HVAC) system, comprising:
a grille housing;
a grille plate assembled to the grille housing, the grille housing and the grille plate defining a grille plenum therebetween;
an airflow inlet defined in the grille housing;

a plurality of airflow outlets defined in the grille plate; and
a plurality of vane arrangements arrayed on the grille plate, each vane arrangement located between adjacent airflow outlets of the grille plate;
each vane arrangement configured such that at each vane arrangement a first portion of a conditioned airflow flowing through the airflow grille is directed between the grille housing and the vane arrangement and a second portion of the conditioned airflow exits the airflow grille through a corresponding airflow outlet of the plurality of airflow outlets;
wherein each vane arrangement includes a plurality of vanes extending from the grille plate; and
wherein one of:
 a vane height of each vane of the plurality of vanes from the grille plate decreases with increasing distance of the vane from the airflow inlet; or
 a vane gap defined between each vane of the plurality of vanes and the grille housing increases with increasing distance from the airflow inlet.

2. The airflow grille of claim 1, wherein the plurality of vane arrangements are configured to substantially equalize a volume of conditioned airflow flowing through the airflow outlets of the plurality of airflow outlets.

3. The airflow grille of claim 1, wherein the plurality of vanes include a plurality of primary vanes and a plurality of secondary vanes arranged parallel to the plurality of primary vanes.

4. The airflow grille of claim 1, wherein the plurality of vanes in each vane arrangement are arranged in a V-shape.

5. The airflow grille of claim 1, wherein the airflow inlet is disposed at a first end of the airflow grille.

6. The airflow grille of claim 1, wherein the grille housing is formed as a concave shape and the grille plate is substantially flat and planar.

7. An airflow grille of a heating, ventilation and air conditioning (HVAC) system, comprising:
a grille housing;
a grille plate assembled to the grille housing, the grille housing and the grille plate defining a grille plenum therebetween;
an airflow inlet defined in the grille housing;
a plurality of airflow outlets defined in the grille plate; and
a plurality of vane arrangements arrayed on the grille plate, each vane arrangement located between adjacent airflow outlets of the grille plate;
each vane arrangement configured such that at each vane arrangement a first portion of a conditioned airflow flowing through the airflow grille is directed between the grille housing and the vane arrangement and a second portion of the conditioned airflow exits the airflow grille through a corresponding airflow outlet of the plurality of airflow outlets;
wherein a cross-sectional area of each airflow outlet of the plurality of airflow outlets increases with increasing distance of the airflow outlet from the airflow inlet.

8. A heating, ventilation and air conditioning (HVAC) system of a vehicle, comprising:
an HVAC unit to generate a conditioned airflow;
one or more airflow grilles operably connected to the HVAC unit to distribute the conditioned airflow to one or more target locations of an occupant compartment of the vehicle, each airflow grille of the one or more airflow grilles including:
 a grille housing;
 a grille plate assembled to the grille housing, the grille housing and the grille plate defining a grille plenum therebetween;
 an airflow inlet defined in the grille housing;
 a plurality of airflow outlets defined in the grille plate; and
 a plurality of vane arrangements arrayed on the grille plate, each vane arrangement located between adjacent airflow outlets of the grille plate;
each vane arrangement configured such that at each vane arrangement a first portion of a conditioned airflow flowing through the airflow grille is directed between the grille housing and the vane arrangement and a second portion of the conditioned airflow exits the airflow grille through a corresponding airflow outlet of the plurality of airflow outlets;
wherein each vane arrangement includes a plurality of vanes extending from the grille plate; and
wherein one of:
 a vane height of each vane of the plurality of vanes from the grille plate decreases with increasing distance of the vane from the airflow inlet; or
 a vane gap defined between each vane of the plurality of vanes and the grille housing increases with increasing distance from the airflow inlet.

9. The HVAC system of claim 8, wherein the plurality of vane arrangements are configured to substantially equalize a volume of conditioned airflow flowing through the airflow outlets of the plurality of airflow outlets.

10. The HVAC system of claim 8, wherein the plurality of vanes include a plurality of primary vanes and a plurality of secondary vanes arranged parallel to the plurality of primary vanes.

11. The HVAC system of claim 8, wherein the plurality of vanes in each vane arrangement are arranged in a V-shape.

12. The HVAC system of claim 8, wherein a cross-sectional area of each airflow outlet of the plurality of airflow outlets increases with increasing distance of the airflow outlet from the airflow inlet.

13. The HVAC system of claim 8, wherein the airflow inlet is disposed at a first end of the airflow grille.

14. The HVAC system of claim 8, wherein the grille housing is formed as a concave shape and the grille plate is substantially flat and planar.

* * * * *